Sept. 30, 1952 J. DELLAPENT 2,612,221
AUTOMOTIVE TRUCK BODY FLEXIBLE CLOSURE
Filed May 13, 1949 2 SHEETS—SHEET 1
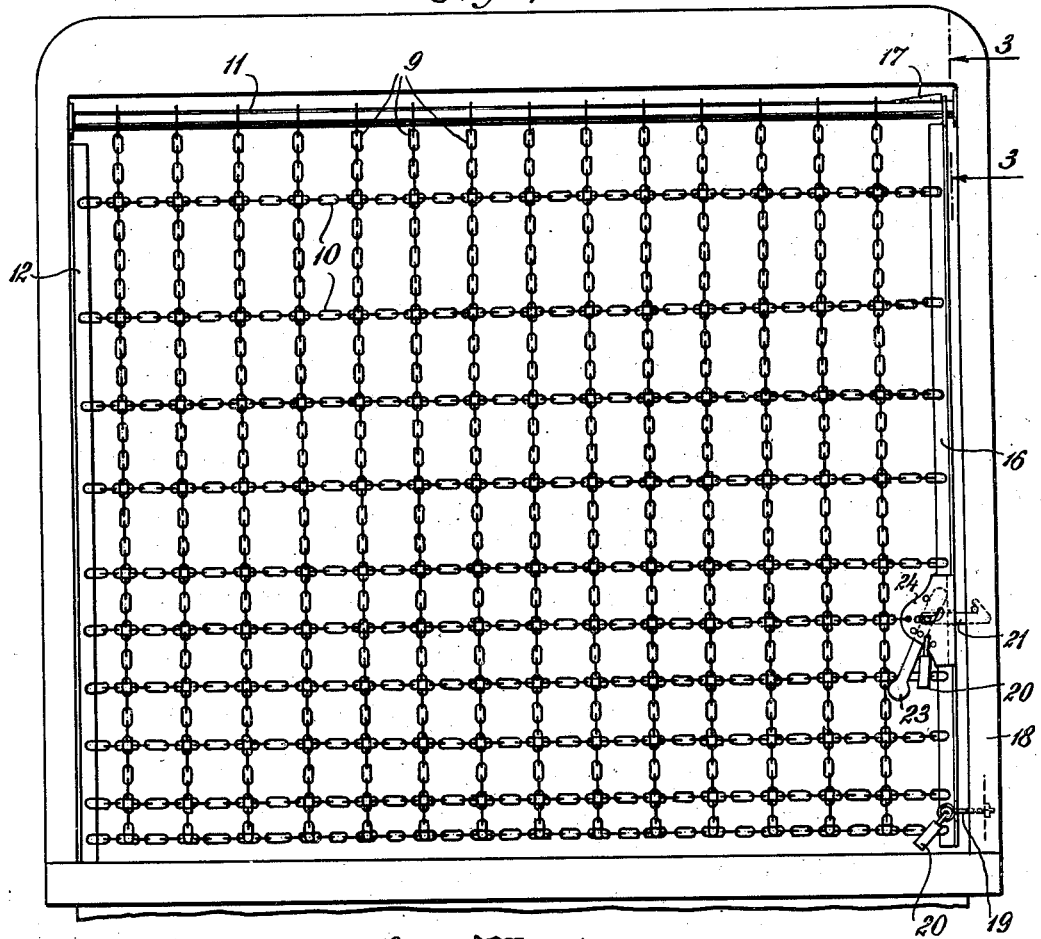
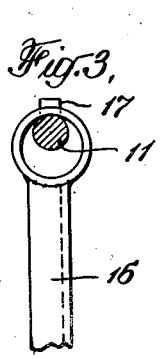
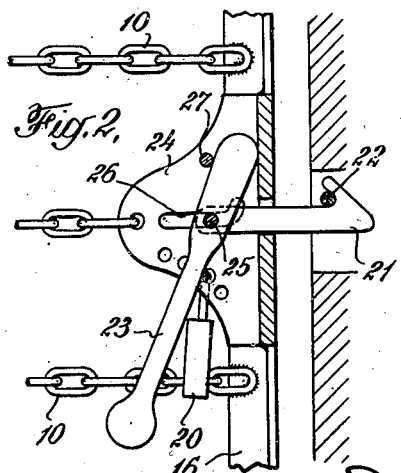
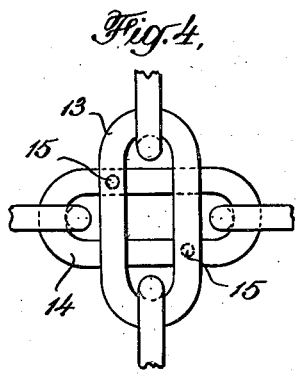
INVENTOR
JOSEPH DELLAPENT
BY
ATTORNEYS

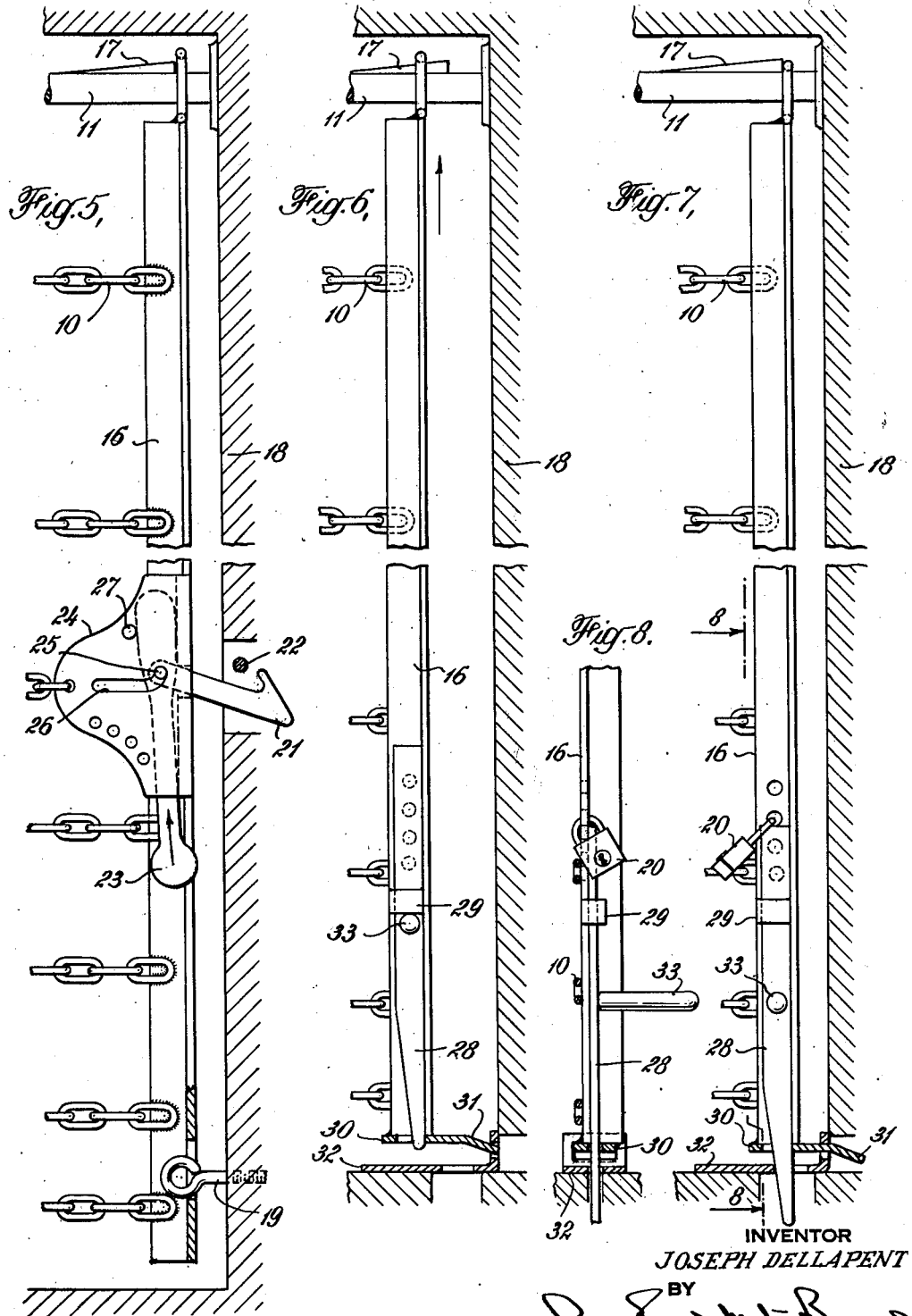

Patented Sept. 30, 1952

2,612,221

UNITED STATES PATENT OFFICE 2,612,221

AUTOMOTIVE TRUCK BODY FLEXIBLE CLOSURE

Joseph Dellapent, Westwood, N. J.

Application May 13, 1949, Serial No. 93,098

3 Claims. (Cl. 160—328)

This invention relates to automotive truck bodies and more particularly to a removable closure for an opening in such a body. The invention is of special utility in automobile trucks for closing the opening at the rear end of the truck body to guard against loss of the contents of the body.

Automobile truck bodies have commonly been provided with a closure for an opening at the rear end thereof in the form of hinged doors or lazy-tong barriers. Such closures, at the time when they are installed, are effective to guard the contents of the truck body, but, under the hard usage incident to frequent loading and unloading, they become loose or worn to the extent of being insufficiently effective, and moreover, such closures are expensive, both when installed incident to building the truck body or when installed as a separate operation thereafter, particularly the latter.

The object of the present invention is to provide a novel form of closable barrier at the end of an automobile truck body which shall be entirely effective for the attainment of its purpose, which shall be less expensive to construct than the forms of closures heretofore employed, and which may be installed readily in a truck under construction and in existing truck bodies.

These objects are attained by making the barrier of chain, preferably vertical lengths and horizontal lengths of chain which are appropriately secured together where they cross, the vertical lengths being suspended from and movable upon a suitable support extending across the top of the opening in the truck body and the horizontal lengths of chain being secured permanently to one of the side walls of the opening in the truck body and detachably to the other side wall. The suspending means preferably takes the form of a rod extending across the opening in the truck body near the top thereof and links at the upper ends of the vertical lengths of chain encircle and are slidable upon this rod. The horizontal lengths of chain are secured at one end to one side wall of the opening and their opposite ends are secured to a rail by which the barrier may be moved conveniently across the opening and means are provided for locking this rail in the closed position with the horizontal lengths of chain extended their full length.

This locking means may take various forms, preferably a form in which provision is made for drawing the barrier fairly taut and holding it in that position. In the preferred construction, the suspending rod referred to is provided with a cam surface and the upper end of the rail at the edge of the barrier encircles this rod and is arranged to drop over the cam as the rail reaches its final closed position. In association with these parts, a locking means is provided for so locking the rail to the side wall of the opening that it cannot be raised to effect release from the cam or be moved laterally away from the side wall of the opening.

The invention will be better understood by reference to the following description in connection with the accompanying drawings which show preferred embodiments. In these drawings, Fig. 1 is a view in elevation showing the barrier in closed position; Fig. 2 is an enlarged detail view of a form of locking means which may be employed; Fig. 3 is a detail view illustrating the mounting of the barrier; Fig. 4 is a detail view showing how the horizontal and the vertical chains are secured together; Fig. 5 is a sectional elevation showing the locking means on a larger scale; Figs. 6 and 7 are views corresponding to Fig. 5 illustrating a modified form of locking means; and Fig. 8 is a sectional elevation of the construction shown in Figs. 6 and 7, the plane of the section being at right angles to that of Figs. 6 and 7.

My improved barrier is applicable to automotive bodies generally for closing an opening therein but is of particular utility as a closure for the rear end of an automobile truck body. It consists primarily of vertical chains 9 and horizontal chains 10 secured together at their crossings, the barrier as a whole being suspended from a support 11 extending across the opening in the truck body near the top thereof. This support 11 is preferably a round rod or tube and the top link of each of the vertical chains 9 is preferably circular so that these links may slide readily back and forth lengthwise of the supporting rod 11.

The horizontal chains 10 are secured at one end thereof to a side wall of the opening in the truck body. For this purpose an angle iron 12 is secured to the side wall and has openings in one flange thereof at spaced points and the end links of the horizontal chains extend through these openings.

The vertical and horizontal chains may be secured together at their crossings in any suitable manner but I prefer to do this as is illustrated in Fig. 4 in which it will be seen that links 13 and 14 of the vertical and horizontal chains lie one against the other and these two links are welded together as indicated at 15.

The opposite ends of the horizontal chains are similarly secured to a rail 16 which is an angle iron rail like rail 12 but is movable across the opening in the truck body. The upper end of this rail 16 is provided with an opening through which the rod 11 extends, the rod forming a support from which the rail 16 is suspended. On the upper surface of the rod 11 near the end thereof is a cam 17 and the upper end of rail 16 will travel up this cam as the rail is moved to the closing position and drop over the end of the cam as shown in Fig. 1 when the rail reaches the closing position.

Means are provided for locking the rail 16 in its closed position and preferably this includes means for holding the rail 16 against vertical movement which would lift its upper end over the wall of cam 17 and also against horizontal movement of the rail as a whole or its lower end only away from the side wall 18 of the opening in the truck body. For this purpose an eye-bolt 19 may be provided upon the side wall 18 of the truck body as shown in Figs. 1 and 5 and an opening may be provided in the flange of rail 16 such that on movement of the rail 16 to its closing position the opening will pass over the eye of the bolt 19 and a padlock 20 may be hooked into the eye of bolt 19 to hold the rail 16 against movement either upwardly or laterally.

Figs. 1, 2 and 5 illustrate another form of locking means which may be employed with or in substitution for that described, this alternative form having the advantage that it does not employ any part which, like the bolt 19, projects into the opening in the truck body where it may be bent or broken in the operation of moving cargo into or out of the truck body. This construction illustrated in Figs. 2 and 5 includes a hook 21 adapted to cooperate with a bolt 22 mounted securely in an opening in the side wall 18 of the truck body. This hook 21 is manipulated by a handle 23 mounted between plates 24 which are secured to the rail 16. On the handle 23 is a stud 25 traveling in a groove 26 in one or both of the plates 24, this groove being straight throughout a major portion of its length and turned angularly on a curve at one end. The arrangement is such that when the free end of the handle 23 is moved laterally the opposite end turns in the space between the wall of the rail 16 and a stud 27 on plates 24 and the resultant travel of the stud 25 in the groove 26 causes the end of hook 21 to be moved vertically into coaction with the bolt 22. Thereafter the hook 21 is moved laterally relatively to the plates 24 and rail 16, thus drawing the rail 16 over close to the side wall 18 and drawing the chain fairly taut. The plates 24 are provided with a series of openings and a padlock 20 may be interlinked with any one of these openings to hold the handle 23 against unauthorized movements to effect release of the barrier.

Figs. 6, 7 and 8 illustrate another form of locking means which may be employed. In this construction the rail 16 has a bolt 28 mounted upon it for vertical sliding movement in one or more guides 29. The lower end of this bolt is wedge-shape as shown and passes through a plate 30 on the lower end of rail 16 which plate has its end 31 inclined to provide a cam surface. The lower end of the bolt 28 is adapted to enter an opening in a plate 32 mounted upon the floor of the truck body and one end of this plate is turned upwardly as shown and provided with an opening to receive the inclined end 31 of the plate 32. The bolt 28 is provided with a handle 33.

When the barrier provided with the rail 16 constructed as shown in Figs. 6, 7 and 8 is moved to the closed position, its upper end passes over the cam 17 and the inclined end 31 of plate 30 passes through the opening in the vertical wall of plate 32, drawing rail 16 downwardly and holding it against upward movement which would release it from the vertical wall of cam 17. The bolt 28 would then be moved downwardly by its handle 33, projecting its end through the opening in the horizontal wall of plate 32, whereupon the wedge surface at the end of bolt 28 forces the rail 16 over toward the side wall of the opening in the truck body to the final closing position. In this position the bolt may be locked by a padlock 20 inserted in the appropriate one of several openings in the flange of rail 16.

I claim:

1. In a flexible closure structure for closing an opening in a body defined by top, bottom and side walls, including a flexible closure secured to one side wall of said opening and means for locking the flexible closure in closed position across said opening, a support extending across the top of the opening adjacent to the top wall of the opening and on which the flexible closure is supported for movement lengthwise of the support, a rail secured to elements of the flexible closure opposite said side wall and suspended by its upper end from and movable along said support, said locking means comprising a cam on the upper portion of the support adjacent to and spaced from the opposite side wall of the opening and having an abrupt vertical surface facing said opposite side wall cooperating with the upper end of the rail above the support to hold it in closed position when the rail is moved to a position adjacent the opposite side wall of the opening, said locking means also including a movable wedging member mounted on the lower portion of the rail cooperating with a member fixed to said body adjacent said opposite side wall and movable to draw the lower portion of the rail toward said opposite side wall, and means mounted on the lower portion of the rail cooperating with a member fixed to said body and movable upon movement of the rail toward said opposite side wall for drawing the rail downwardly, thereby preventing disengagement of the upper end of the rail.

2. In a flexible closure structure for closing an opening in a body defined by top, bottom and side walls, including a flexible closure the flexible elements of which are secured to one side wall of said opening and means for locking the flexible closure in closed position across said opening, a support extending across the top of the opening adjacent to the top wall of the opening and by which the flexible closure is supported for movement lengthwise of the support, and a rail secured to elements of the flexible closure opposite said side wall and suspended by its upper end from and movable along said support, the upper end of the rail having an opening therethrough through which the support extends, said locking means comprising a cam on the upper portion of the support adjacent to and spaced from the opposite side wall of the opening, said cam having an abrupt vertical surface spaced from and facing said opposite side wall and cooperating with the upper end of the rail above the support to hold it in closed position, the rail being movable upwardly to permit movement of its upper end over said cam and into a position between the vertical surface of the cam and the opposite side wall of the opening in the body, said locking means also including means for drawing the lower portion of the rail toward said opposite side wall and for applying a downward tension on said rail, whereby the upper end of said rail is prevented from disengaging the abrupt vertical surface of said cam.

3. An automotive truck body having an opening at one end thereof defined by top, bottom and side walls, a barrier for the opening comprising a plurality of vertical lengths of chain and a plurality of horizontal lengths of chain extending across the opening and secured to the vertical lengths, means securing the horizontal lengths of chain at one end thereof to one side wall of the opening in the truck body, a support extending across the top of the opening adjacent to the top wall thereof, means for mounting the upper ends of the vertical chains on the support permitting movement thereof lengthwise of the support, an upright rail in said opening suspended from and movable along said support, the ends of the horizontal chains opposite those secured to said side wall being attached to said rail, a cam on the upper portion of the support adjacent the other side wall of the opening cooperating with the rail when the rail and chains are moved to closed position, said cam having a surface sloping gradually upwardly toward said other side wall and having an abrupt vertical surface facing and spaced from said other side wall, said rail having an opening at its upper end through which said support extends, said opening in the rail being large enough to freely accommodate said support and to permit vertical movement of the rail to accommodate the cam, the upper part of the rail forming the upper portion of the opening in the rail being adapted to slide along the support and along the sloping cam surface and to engage the abrupt vertical surface of the cam and the support when the rail and chains are moved to closed position, and means for drawing the lower portion of the rail toward said other side wall and for applying a downward tension on the rail for preventing disengagement of its upper end from said cam.

JOSEPH DELLAPENT.

REFERENCES CITED

The following references are of record in the file of this patent:

UNITED STATES PATENTS

| Number | Name | Date |
|---|---|---|
| 1,635,601 | Benca | July 12, 1927 |
| 1,920,416 | Melaun | Aug. 1, 1933 |
| 2,088,072 | Tobin | July 27, 1937 |